United States Patent
Edpalm et al.

(10) Patent No.: US 12,483,714 B2
(45) Date of Patent: Nov. 25, 2025

(54) ENCODING OF VIDEO STREAM DURING CHANGING CAMERA FIELD-OF-VIEW

(71) Applicant: Axis AB, Lund (SE)

(72) Inventors: Viktor Edpalm, Lund (SE); Song Yuan, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 18/606,404

(22) Filed: Mar. 15, 2024

(65) Prior Publication Data

US 2024/0333948 A1 Oct. 3, 2024

(30) Foreign Application Priority Data

Apr. 3, 2023 (EP) ..................................... 23166331

(51) Int. Cl.
*H04N 19/30* (2014.01)
*H04N 19/139* (2014.01)
*H04N 19/172* (2014.01)
*H04N 23/69* (2023.01)

(52) U.S. Cl.
CPC ........... *H04N 19/30* (2014.11); *H04N 19/139* (2014.11); *H04N 19/172* (2014.11); *H04N 23/69* (2023.01)

(58) Field of Classification Search
CPC .... H04N 19/30; H04N 19/139; H04N 19/172; H04N 23/69
See application file for complete search history.

(56) References Cited

U.S. PATENT DOCUMENTS

| | | | |
|---|---|---|---|
| 10,051,281 B2 | 8/2018 | Zhou et al. | |
| 10,616,592 B2 | 4/2020 | Edpalm et al. | |
| 10,798,418 B2 | 10/2020 | Edpalm et al. | |
| 2012/0075436 A1* | 3/2012 | Chen | H04N 13/161 348/51 |

(Continued)

FOREIGN PATENT DOCUMENTS

| | | |
|---|---|---|
| EP | 3396952 B1 | 4/2019 |
| JP | 2008211508 A | 9/2008 |

(Continued)

OTHER PUBLICATIONS

Extended European Search Report issued on Sep. 1, 2023 for European Patent Application No. 23166331.1.

(Continued)

*Primary Examiner* — Jae N Noh
(74) *Attorney, Agent, or Firm* — Volpe Koenig

(57) ABSTRACT

A method of encoding a video stream is provided, including obtaining a first image with a first FOV; encoding the first image as part of a first encoded video frame; obtaining a second image with a second FOV different from the first FOV; generating a first additional video frame referencing the first video frame, including motion vectors transforming image content of the first image to a FOV closer to the second FOV than the first FOV, wherein the motion vectors are formed based on a difference between the first and second FOVs; inserting the first additional video frame into the encoded video stream as a no-display frame, and encoding the second image as part of a second video frame of the encoded video stream referencing the first additional video frame. A corresponding device, computer program and computer program product are also provided.

12 Claims, 4 Drawing Sheets

(56) References Cited

U.S. PATENT DOCUMENTS

2015/0195563 A1\* 7/2015 Ramasubramonian ...................... H04N 19/44
                                                              375/240.15
2015/0381999 A1    12/2015 Chuang et al.
2022/0337853 A1\* 10/2022 Li ...................... H04N 19/1883

FOREIGN PATENT DOCUMENTS

JP    2014192704 A    10/2014
WO    2018164930 A1    9/2018

OTHER PUBLICATIONS

Naderi, H., et al., "Triple Motion Estimation and Frame Interpolation based on Adaptive Threshold for Frame Rate Up-Conversion", Article, Cornell University. (2022).
Schwarz, H., et al. "Overview of the Scalable Video Coding Extension of the HJ.264/AVC Standard", IEEE Transactions on Circuits and Systems for Video Technology, (2007).

\* cited by examiner

ENCODING OF VIDEO STREAM DURING CHANGING CAMERA FIELD-OF-VIEW

TECHNICAL FIELD

The present disclosure relates to encoding of a video stream recorded by a camera. In particular, the present disclosure relates to encoding of the video stream during times when a field-of-view of the camera changes.

BACKGROUND

In contemporary video coding algorithms, predictive coding is often used to take advantage of the fact that many details of the scene may remain static between one image frame and the next. Additionally, so called "motion vectors" may be used to also account for an object moving between image frames, in order to instruct a decoder in what regions of one or more other image frames to look for image data belonging to the object when decoding a current image frame containing the object.

However, for certain kinds of movements and scaling of objects between image frames, caused by e.g. changing a field-of-view (FOV) of the camera between capturing two image frames, using such motion vectors to efficiently encode/decode the video stream may be difficult. One such situation is when the camera performs a zooming-operation, resulting in the motion vectors becoming longer and also varying for different parts of an image frame as time progresses. As the lengths of the ideal motion vectors increase, an encoder would be forced to enlarge the search area in e.g. previous image frames in order to find such motion vectors. This may thus lead to an increase in required computational time, and may often also often result in that the use of motion vectors becomes unrealistic and sometimes even intractable.

Consequently, there is therefore a need for an improved way of encoding a video stream with image frames captured during a changing FOV of the camera.

SUMMARY

To at least partially satisfy the above-identified need, the present disclosure provides an improved method, device, computer program and computer program product for encoding a video stream, as defined in and by the accompanying independent claims. Various embodiments of the method, device, computer program and computer program product are defined in and by the accompanying dependent claims.

According to a first aspect of the present disclosure, there is provided a method of encoding a video stream. The method includes (e.g. as a step "a") obtaining a first image captured by a video camera having a first field-of-view (FOV). The method includes (e.g. as a step "b") encoding the first image as part of a first video frame of an encoded video stream. The method includes (e.g. as a step "c") obtaining a second image captured by the video camera (while) having a second FOV which is different from, but (which) at least partially overlaps, the first FOV. The method includes (e.g. as a step "d") generating a first additional video frame referencing the first video frame, and including first motion vectors transforming an image content of the first image into a FOV closer to the second FOV than the first FOV (is), wherein the first motion vectors are formed based on a difference between the second FOV and the first FOV. The method includes (e.g. as a step "e") inserting the first additional video frame into the encoded video stream, and includes marking the first additional video frame as a no-display frame. The method further includes (e.g. as a step "f") encoding the second image as part of a second video frame of the encoded video stream, wherein the second video frame references the first additional video frame.

As used herein, that a FOV of an image is transformed such that it is "closer to another FOV" also includes the situation where the FOV of the image is transformed such that it exactly matches the other FOV. That FOVs of two image frames "at least partially overlap" should be understood as there being at least one object, or at least one part of an object, which is visible in both image frames, such that motion vectors can be used to find that (part of the) object in one image frame when encoding the other image frame, etc. A "no-display frame" is to be understood as a frame which is in any way flagged to instruct the decoder that the frame is not to be rendered as part of a decoded video stream, but that the frame is still available such that information may be obtained from it and used for the decoding of one or more other image frames which are to be displayed (i.e. not marked as no-display frames). It is envisaged that any video coding standard which supports the above concepts of no-display frames, motion vectors and the possibility of one frame referencing another (previous or later) frame when encoding/decoding may be used to realize the disclosed method. Examples of such standards include (but are not necessarily limited to): High Efficiency Video Coding (HEVC) H.265, Advanced Video Coding (AVC) H.264, VP8, VP9, AV1, and Versatile Video Coding (VVC) H.266.

As envisaged herein, the first motion vectors do not need to be calculated by performing motion vector-searching, but may be derived/calculated based on knowledge about the respective first and second FOVs of the camera. For example, such knowledge may include data indicating e.g. an orientation (as defined by e.g. pan/tilt/roll-angles), and e.g. a focal length of a lens of the camera (as changed during e.g. a zooming-operation), or similar, at times including both a time when the first FOV was present and a time when the second FOV was present.

As will be described in more detail later herein, the envisaged method of the first aspect improves upon currently available coding technologies in that it provides a more bitrate-efficient way of encoding a video stream during a changing FOV of the camera, such as during e.g. a zooming-operation. In particular, the need to search for long and varying motion vectors as part of encoding the second video frame is removed, as the (first) motion vectors needed to define the transformation from the first FOV to (or closer to) the second FOV may instead be calculated from knowledge about e.g. camera orientation and focal length (i.e. zoom-level), and e.g. without requiring any computationally cumbersome motion vector-search to be performed. As the second video frame references the first additional video frame (wherein, at least after decoding, the transformed view of e.g. a particular zoomed-in-on object is available), finding motion vectors for such referencing is more trivial and can be performed using conventional methods of searching. In case of e.g. a zooming-operation, the first additional video frame will encode a scaled and cropped version of the first image in the first video frame, and the bitrate may thus be reduced as motion vector-search will more trivially be able to find matches in the first additional video frame in order to encode the second video frame. In addition, the first additional video frame does not need to contain any new image data itself, but only the motion vectors calculated based on the differences in FOVs, and needed to efficiently perform transformations such as scaling. The envisaged method may also be applied for other transformations than scaling, such as when the camera pans, tilts and/or rolls. A panning- or tilting-operation may require a perspective transformation which can be described in the additional video frame, and a rolling-operation may require a rotational transformation which may also be described in the additional video frame.

In one or more embodiments of the method, encoding the video stream may include using a layered type of coding, such as for example "scalable video coding" (SVC) or "Scalable High Efficiency Video Coding" (SHVC). The first additional video frame may be inserted in a base layer of the encoded video stream, and the second video frame may be inserted in an enhancement layer of the encoded video stream. An example of scalable video coding may for example be as defined in the Annex G extension of the H.264/MPEG-4 AVC video compression standard. Another example of scalable video coding may for example be as defined in the Annex H extension of the H.265/MPEG-H HEVC video compression standard. As an example, the base layer may be encoded to provide a lower resolution (e.g. full HD resolution or similar), while the enhancement layer may be encoded to provide a higher resolution (such as e.g. 4K resolution or similar). In a layered type of coding, there may of course also be one or more additional enhancement layers, and it is envisaged that e.g. the second video frame may be encoded as part of any such enhancement layer. Using a layered coding such as SVC may e.g. help to maintain a desired frames-per-second (FPS) rate, as the first additional video frame and the second video frame may be inserted in different layers, thus avoiding the (no-display) first additional video frame having to be inserted e.g. in between two video frames which are to be displayed.

In one or more embodiments of the method, the first additional video frame may be one of a predicted frame (a "P-frame"), and a bidirectional predicted frame ("B-frame"). As used herein, these various types of video frames are defined as commonly done in contemporary coding standards. A P-frame may use/reference data from one or more previous video frames in order to be decoded, while a B-frame may use/reference data from both one or more previous and one or more future/forward video frames in order to be decoded. Such video frames may also be referred to as "inter frames" or "inter-coded frames", as they include references to one or more other video frames, in contrast to e.g. "intra frames" or "intra-coded frames" ("I-frames"), which do not contain any references to one or more other video frames.

In one or more embodiments of the method, the method may include continuing to generating and inserting one or more additional video frame while the FOV of the camera is changing (i.e. during an ongoing zooming-operation or similar). This may correspond to the method further including (e.g. as an additional step "g") obtaining a third image captured by the video camera having a third FOV which is different from, but (which) at least partially overlaps, the second FOV. The method may further include (e.g. as an additional step "h") generating a second additional video frame, and including second motion vectors transforming an image content of the second image into a FOV closer to the third FOV than the second FOV, wherein the second motion vectors are formed based on a difference between the third FOV and the second FOV. The method may further include (e.g. as an additional step "i") inserting the second additional video frame into the encoded video stream, including marking the second additional video frame as a no-display frame.

The method may further include (e.g. as an additional step "j") encoding the third image as part of a third video frame of the encoded video stream, wherein the third video frame references the second additional video frame. Phrased differently, if continuing to insert more additional video frames in the encoded video stream, the method may include repeating the steps c-f described above, but with "first and second" replaced with "second and third", etc.

Phrased differently, additional video frames may thus be inserted as long as e.g. a zooming-operation is ongoing. Instead of attempting to encode the actual images captured during the ongoing zooming-operation (such as the second and third images, and so on) by searching for motion vectors in previously captured frames, the images captured by the cameras after the FOV-changing has begun are instead encoded (as the second and third video frames, and so on) by referencing the respective additional video frames (such as the first and second additional video frames, and so on).

In one or more embodiments of the method, the difference between the first FOV and the second FOV (or the difference between e.g. the second FOV and the third FOV, etc.) may be due to a zooming-operation performed by the camera. The zooming-operation may e.g. be ongoing while the method is performed, such as when the encoded video stream represents a live-stream of the captured scene. The envisaged method may also be used for a transcoding case, wherein the method is applied to already recorded video material, and used to e.g. optimize (reduce) a size needed to store such video material in storage (on e.g. a server). In such a case, it may be envisaged that e.g. the data pertinent to the various FOVs of the camera during the transformation (such as e.g. camera orientation angles, focal length defining the zoom-levels of the camera at each time, camera mounting position relative to the scene, etc.) are stored as metadata within the recorded video frames, or similar, e.g. as part of a video frame header.

In one or more embodiments of the method, the zooming-operation may be a zooming-in-operation, such that the second FOV is a magnification of the first FOV (and e.g. such that the third FOV is a magnification of the second FOV, and so on). Applying the method while performing a zooming-in-operation may be advantageous in that e.g. a larger part of each image may be referenced by the next image in the video stream. It should be noted that the envisaged method may also be applied during e.g. a zooming-out-operation, such that e.g. the second FOV is instead a reduction/de-magnification of the first FOV, and so on, but with less benefits as only a smaller part of each image may be referenced by the next image in the video stream.

In one or more embodiments of the method, the first and second images may e.g. be sequential images of a video stream captured by the camera, such that the adding of an additional (no-display) video frame is performed for each image of the video stream while the camera transformation is ongoing, and such that e.g. each encoded (to-be-displayed) video frame references a corresponding additional (no-display) video frame.

In one or more embodiments of the method, the method may be performed in the camera used to capture at least the first and second images. This may allow e.g. the encoded video stream to be generated at "the edge", without requiring additional, intermediate video processing equipment.

Generally herein, it is assumed that a video frame of the encoded video stream that is to be displayed (e.g. not marked as a no-display frame) references at least its corresponding additional (no-display) video frame, and that each additional (no-display) video frame references at least the previous (no-display) video frame in the encoded video stream. It may of course also be the case that e.g. a (to-be-displayed) video frame references also e.g. the previous (to-be-displayed) video frame in the encoded video stream. If using layered coding, such as SVC, each video frame in the enhancement layer may thus reference a corresponding additional video frame in the base layer but also, if desirable, reference e.g. one or more previous (or even future/forward) video frames in the enhancement layer.

According to a second aspect of the present disclosure, there is provided a corresponding device for encoding a video stream. The device includes a processor and a memory. The memory stores instructions that, when executed the processor, cause the device to perform the method according to the first aspect. This includes causing the device to obtain a first image captured by a video camera having a first FOV; to encode the first image as part of a first video frame of an encoded video stream; to obtain a second image captured by the video camera having a second FOV which is different from, but at least partially overlaps, the first FOV; to generate a first additional video frame referencing the first video frame, and including first motion vectors transforming an image content of the first image into a FOV closer to the second FOV than the first FOV, wherein the first motion vectors are formed/calculated based on a difference between the second FOV and the first FOV; to insert the first additional video frame into the encoded video stream, including marking the first additional video frame as a no-display frame; and to encode the second image as part of a second video frame of the encoded video stream, wherein the second video frame references the first additional video frame.

In one or more embodiments of the device, the instructions stored in the memory of the device may be further such that they, when executed by the processor, cause the device to perform any embodiment of the method (of the first aspect) as disclosed and discussed herein.

In one or more embodiments of the device, the device may be a camera for capturing at least the first and second images.

According to a third aspect of the present disclosure, there is provided a corresponding computer program for encoding a video stream. The computer program is configured to (i.e. includes instructions/computer code that), when executed by a processor of a device (such as the device of the second aspect), causes the device to perform the method of the first aspect. This include causing the device to obtain a first image captured by a video camera having a first FOV; to encode the first image as part of a first video frame of an encoded video stream; to obtain a second image captured by the video camera having a second FOV which is different from, but at least partially overlaps, the first FOV; to generate a first additional video frame referencing the first video frame, and including first motion vectors transforming an image content of the first image into a FOV closer to the second FOV than the first FOV, wherein the first motion vectors are formed/calculated based on a difference between the second FOV and the first FOV; to insert the first additional video frame into the encoded video stream, including marking the first additional video frame as a no-display frame; and to encode the second image as part of a second video frame of the encoded video stream, wherein the second video frame references the first additional video frame.

In one or more embodiments of the computer program, the computer program (i.e. the instructions/computer code provided therewith) may be configured to further, when executed by the processor, cause the device to perform any embodiment of the method (of the first aspect) as disclosed and discussed herein.

According to a fourth aspect of the present disclosure, there is provided a corresponding computer program product. The computer program product includes a computer-readable storage medium which stores a computer program according to the third aspect (or according to any herein described and discussed embodiments thereof). As used herein, the computer-readable storage medium may e.g. be non-transitory, and be provided as e.g. a hard disk drive (HDD), solid state drive (SDD), USB flash drive, SD card, CD/DVD, and/or as any other storage medium capable of non-transitory storage of data. In other embodiments, the computer-readable storage medium may be transitory and e.g. correspond to a signal (electrical, optical, mechanical, or similar) present on e.g. a communication link, wire, or similar means of signal transferring.

Other objects and advantages of the present disclosure will be apparent from the following detailed description, the drawings and the claims. Within the scope of the present disclosure, it is envisaged that all features and advantages described with reference to e.g. the method of the first aspect are relevant for, apply to, and may be used in combination with also the device of the second aspect, the computer program of the third aspect, and the computer program product of the fourth aspect, and vice versa.

BRIEF DESCRIPTION OF THE DRAWINGS

Exemplifying embodiments will now be described below with reference to the accompanying drawings, in which.

Figure 1:
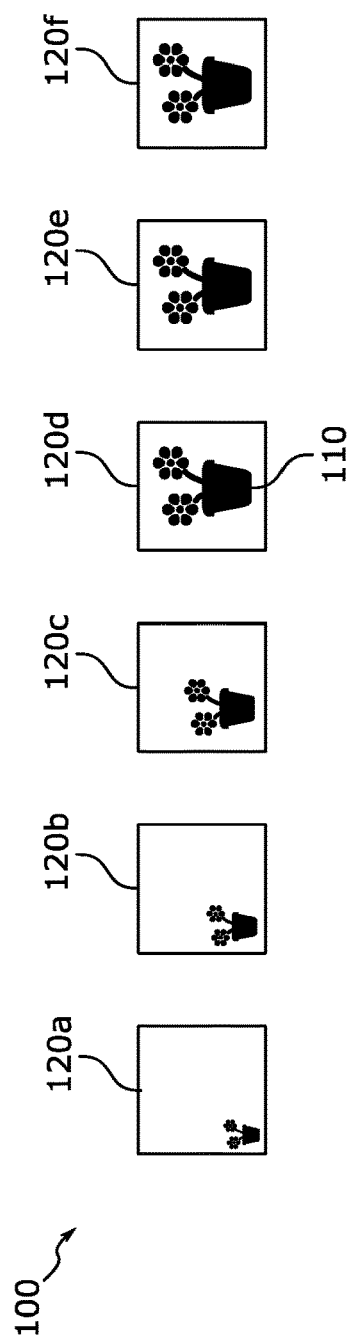
FIG. 1 schematically illustrates an example of a video stream in which a FOV of the camera changes during capturing of the images.

In the drawings, like reference numerals will be used for like elements unless stated otherwise. Unless explicitly stated to the contrary, the drawings show only such elements that are necessary to illustrate the example embodiments, while other elements, in the interest of clarity, may be omitted or merely suggested. As illustrated in the Figures, the (absolute or relative) sizes of elements and regions may be exaggerated or understated vis-à-vis their true values for illustrative purposes and, thus, are provided to illustrate the general structures of the embodiments.

DETAILED DESCRIPTION

FIG. 1 schematically illustrates one typical example a video stream 100 captured by a (video) camera, wherein a FOV of the camera changes during the capturing. In this particular example, the change of FOV is due to the camera performing a zooming-operation, and more in particular a zooming-in-operation which also includes a slight panning and tilting of the camera in order to move an object of interest into a center of the FOV of the camera.

For this particular example, the scene is assumed to include a single object 110 of interest. Here, this object 110 is assumed to be a flower in a flowerpot, but may of course be any combination of one or more other objects. The video sequence 100 includes a first image 120*a* is captured by the camera at a first FOV. Here, the first FOV is such that the object 110 only occupies a lower-left corner of the first image 120*a*. As time progresses, the camera then starts zooming-in on the object 110, e.g. by adjusting its lens, and/or by using digital processing emulating such physical zooming, and also pans slightly to the left as well as tilts slightly down, in order to center the object 110 in the middle of the FOV.

When a next, second image 120*b* is captured by the camera, the camera thus has a second FOV which provides a magnification of the object 110 compared with the first FOV. The object 110 is somewhat larger in size when depicted in the second image 120*b* compared to when depicted in the first image 120*a*, and has also started to move towards the center of the image due to the panning and tilting of the camera.

As time progresses further, the camera keeps on zooming while capturing more images of the scene, such that the object 110 e.g. becomes larger and larger and occupies a greater and greater part of each image. In the particular example shown in FIG. 1, this includes capturing a third image 120*c* with the camera having a third FOV, and a fourth image 120*d* with the camera having a fourth FOV. After having captured the fourth image 120*d*, in which the object 110 now occupies almost all of the available image space and is more or less centered in the FOV, the camera stops the zooming-operation. For successive frames, such as a fifth image 120*e* and a sixth image 120*f*, the FOV of the camera remains unchanged and equal to the fourth FOV used to capture the fourth image 120*d*.

In order to encode the video stream 100 in order to save e.g. bitrate/bandwidth, various encoding schemes may be applied. A conventional such scheme could for example start with encoding the first image 120*a* as an intra-predicted frame (I-frame), or similar, without any references to one or more additional video frames. The second image 120*b* could then be encoded as an inter-predicted frame (P-frame), providing a reference to the I-frame encoding the first image 120*a* in the form of e.g. motion vectors. However, in order to find such motion vectors, the encoder would first have to perform a motion vector-search, in which it attempts to identify, for each part of the second image 120*b*, from what part of the first image 120*a* image data should be retrieved from in order to later decode the P-frame encoding the second image 120*b*. This is often achieved by defining a limited search area around each part of the second image 120*b*, and then searching through this area in the first image 120*a* to look for a suitable match. If the change in camera-FOV did not include a zooming-operation, but only e.g. a slow translational movement of the camera (such as a panning), this would most likely be an efficient way of encoding the P-frame (and thereby the second image 120*b*) as the required search area would remain small, and the motion vectors would be approximately the same for all parts of the second image 120*b*.

However, in the case of a zooming-operation as shown in FIG. 1, the search for such motion vectors would likely be more difficult, and would require the search area to be expanded. In addition, the motion vectors would be different for many or even all parts of the second image 120*b*, as the movement of e.g. a pixel belonging to the flowerpot would be less than that of e.g. a pixel belonging to the top of the flower, and as e.g. pixels belonging to the left part of the object 110 would have approximately moved only upwards in the second image 120*b* compared to in the first image 120*a*, while e.g. pixels belonging to the right part of the object 110 would instead have moved both upwards and to the right. As the zooming progresses and different parts of the object 110 starts to move even faster away from each other for each new captured image (and as each new P-frame would have to reference e.g. the previously encoded P-frame), the motion vectors would become both longer and longer, and also vary more and more (in direction) for different parts of the second image 120*b* and the P-frame encoding it. As a result, the processing power required for performing such motion vector-search would risk exceeding e.g. the capabilities of the entity responsible for the encoding, which, in a live-situation, may for example be the camera itself.

Figure 3:
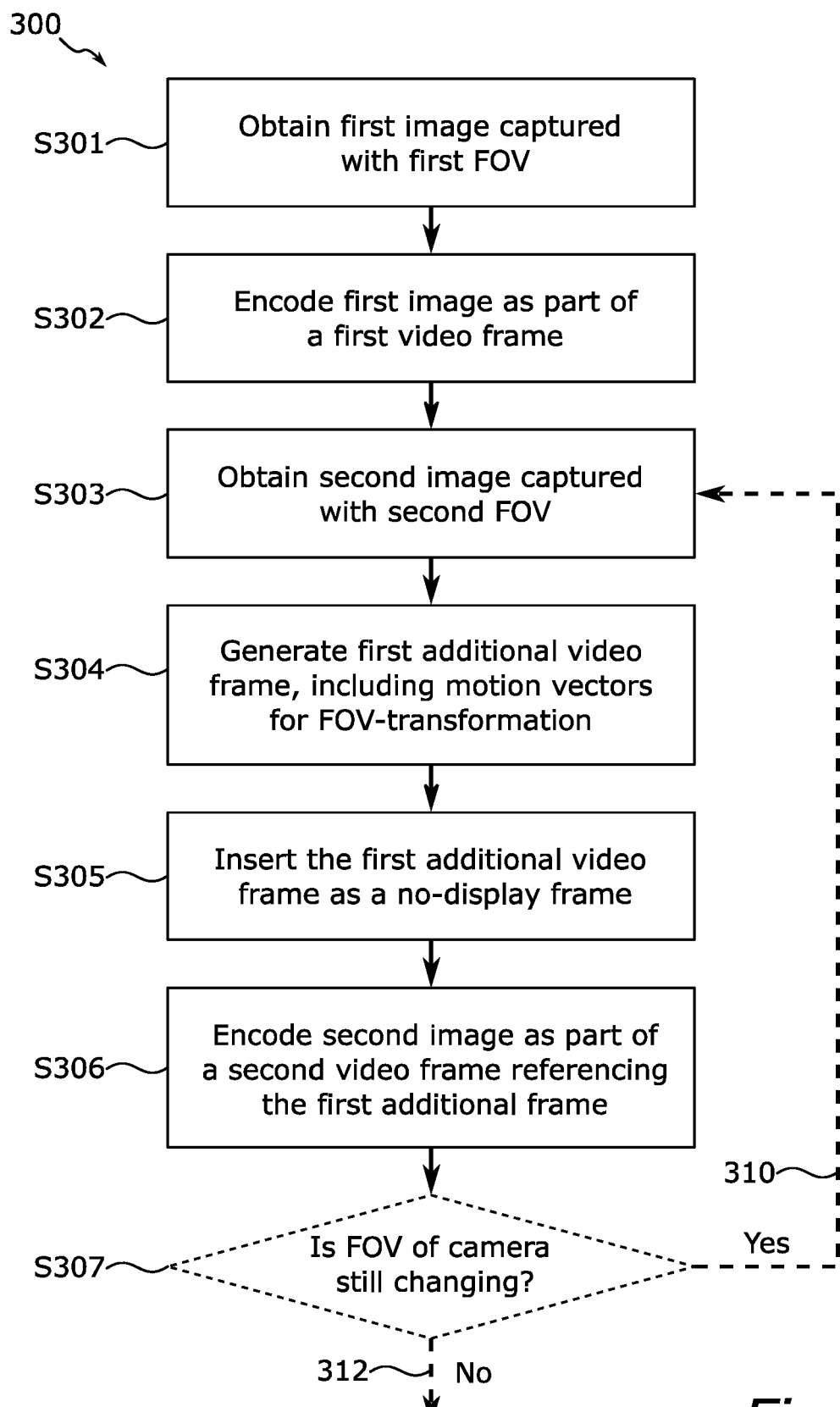
FIG. 3 schematically illustrates a flowchart of an improved method of encoding a video stream, in accordance with embodiments of the present disclosure.
Figure 4:
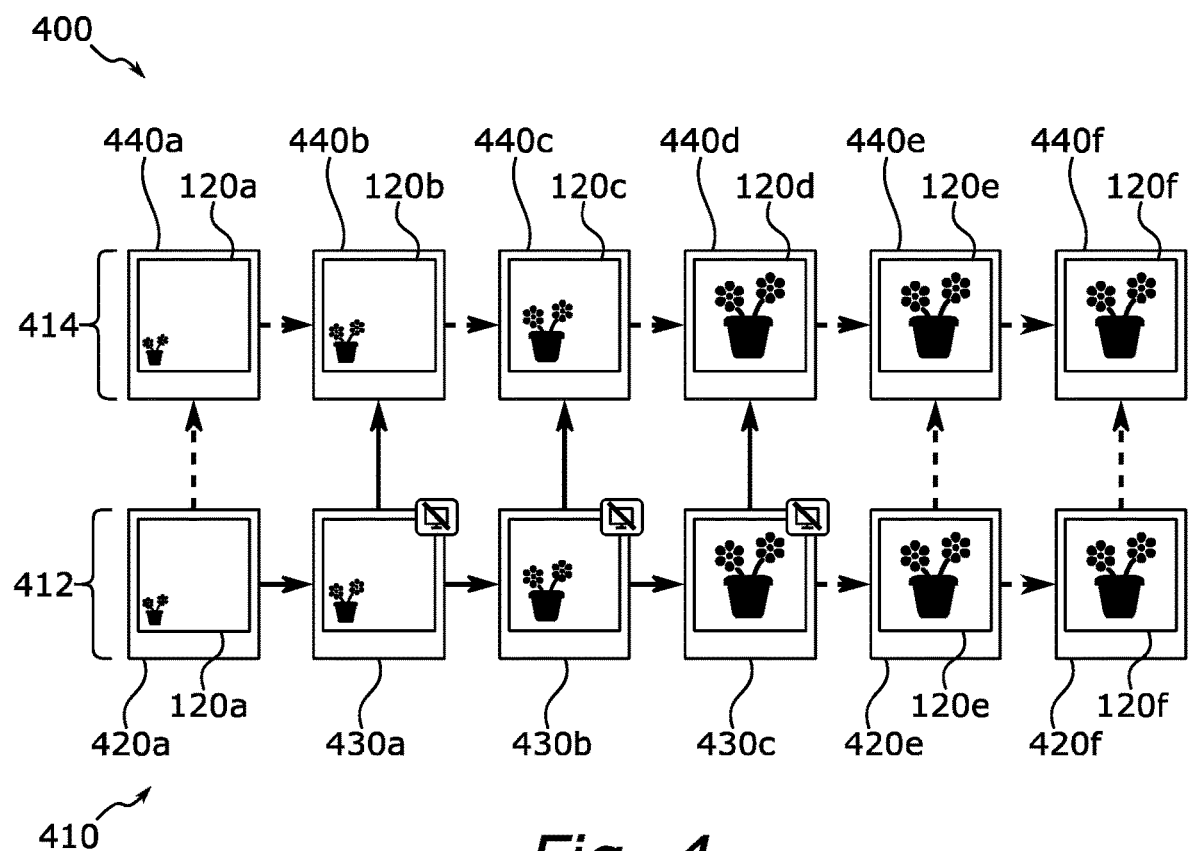
FIG. 4 schematically illustrates another example of an improved method of encoding a video stream applied to the video stream of FIG. 1, in accordance with embodiments of the present disclosure.

How a method as envisaged herein can improve on this situation will now be described in more detail with reference to e.g. FIGS. 2 and 4. Reference is also made to FIG. 3, which schematically illustrates a flowchart 300 of various steps of such a method.

Figure 2:
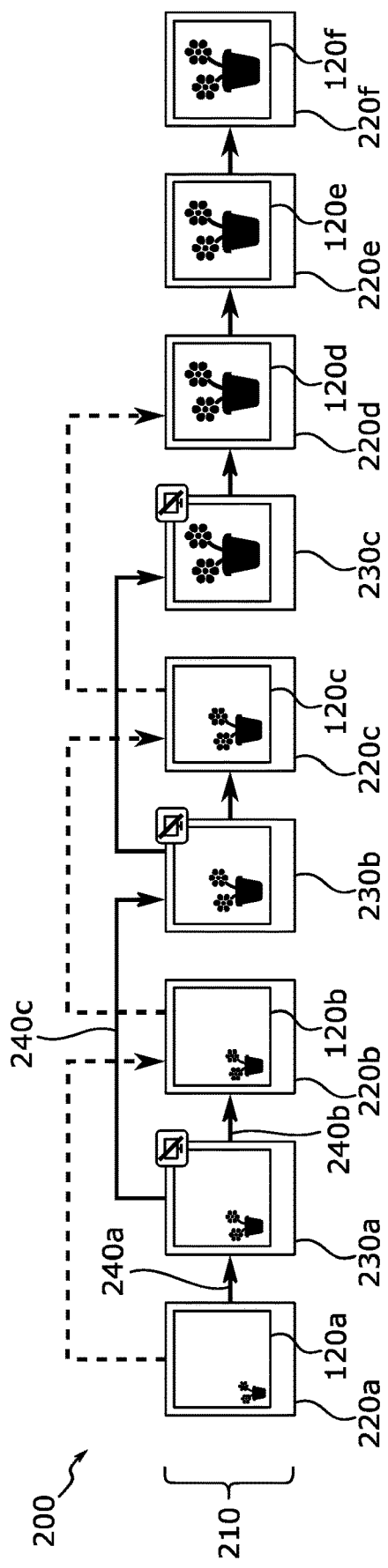
FIG. 2 schematically illustrates an example of an improved method of encoding a video stream applied to the video stream of FIG. 1, in accordance with embodiments of the present disclosure.

FIG. 2 schematically illustrates the encoding of various video frames performed as part of a method 200. As envisaged herein, the improved method 200 includes (as a step S301) obtaining a first image (e.g. the first image 120*a*) captured by a video camera having a first FOV. The method 200 further includes (as a step S302) encoding the first image 120*a* as part of a first video frame 220*a* of an encoded video stream 210. This may be performed as conventionally done, by for example encoding the first video frame 220*a* as an I-frame, or similar, such that the first video frame 220*a* contains all the necessary image data required to decode the first image 120*a* again at the decoder side (not shown). The encoding may e.g. be lossless or generate at least some loss of image quality when decoding the first video frame 210*a*, depending on the exact method used for such encoding of the first video frame 220*a*.

The method 200 includes (as a step S303) receiving a second image (e.g. the second image 120*b*) captured by the video camera having a second FOV. As described earlier herein with reference to e.g. FIG. 1, the first FOV is different from the second FOV, but the second FOV is such that it at least partially overlaps the first FOV. Phrased differently, for the method 200 to work as intended, there should preferably be at least some part of e.g. the object 110 visible in both the first image 120*a* and in the second image 120*b*. More preferably, all parts of the object 110 visible in the second image 120*b* should be visible also in the first image 120*a*.

In contrast to conventional encoding methods, the envisaged improved method 200 does not progress by attempting to directly encode the second image 120*b* as e.g. a regular P-frame using motion vector-search in the first image 120*a*. Instead, in a step S304, the method 200 progresses by generating a first additional video frame 230*a* which references the first video frame 220*a*, and which includes first motion vectors which transforms (in this case, scales and translates) the image content of the first image 120*a* into a FOV which is closer to the second FOV than the first FOV is. These first motion vectors are not found by computationally intensive motion vector-searching, but instead calculated/formed based on knowledge about the second FOV and the first FOV, i.e. about how the FOV of the camera has changed between capturing the first image 120a and the second image 120b. Such information may e.g. be received from the camera itself, and/or from any other particular sensor(s) capable of e.g. detecting a camera orientation (such as pan/tilt/roll-angles or similar, and/or focal length of the camera and its lens). For example, it can be known that between capturing the first and second images 120a and 120b, the FOV of the camera has been changed by e.g. increasing the focal length of the lens with a particular amount, and by tilting the camera slightly downwards while panning the camera slightly to the left (in order to move the object 110 towards the center of the image while zooming). This information can then be used to directly obtain the first motion vectors required to perform a scaling/translation which transforms the FOV of the first image 120a into a FOV which is closer, or equal, to the second FOV used to capture the second image 120b. As used herein, that a "FOV of an image is transformed to some other FOV" is to be understood that as there is calculated a transformation which, if applied to the image content of the image, would render the resulting image look (more) like it was captured by a camera having this other FOV. How the first motion vectors may be formed/calculated based on knowledge about the various FOVs used to capture two images will be described in more detail later here, with reference to e.g. FIG. 5.

After the first motion vectors have been formed/calculated, the method 200 proceeds (in a step S305) by inserting the first additional video frame 230a into the encoded video stream 210, and includes marking the first additional video frame 230a as a no-display frame (as indicated by the crossed-out screen symbols shown in FIG. 2). The first additional video frame 230a is thus not going to be shown during a subsequent decoding of the encoded video stream 210, but only serves as a container of information for the decoding/encoding of other video frames. In particular, in the present example, the first additional video frame 230a need not to include any actual image data, but only the first motion vectors which allow to (during a subsequent decoding of the first additional video frame 230a) transform the FOV of the first image 120a into a FOV which more closely resembles the second FOV, i.e. by scaling, translating and/or rotating the image content of the first image 120a as required.

The method then, in a step S306, continues with encoding the second image 120b as part of a second video frame 220b of the encoded video stream 210, wherein the second video frame 220b is such that it references the first additional video frame 230a. The second video frame 220b may e.g. be a P-frame or similar, with for example motion vectors indicating what parts of the (decoded) first additional video frame 230a that are to be used to decode what parts of the second video frame 220b. Importantly, as the FOV of the (to-be-decoded) image of the first additional video frame 230a more closely resembles (or even equals) that of the second image 120b, finding such motion vectors for the decoding of the second video frame 220b using motion vector-searching becomes more trivial than attempting to directly find such motion vectors based on the image content of e.g. the first image 120a. The motion vectors for the second video frame 220b may e.g. be found by comparing the image content of the second image 120b with that of the translated image content of the first image 120a included in (or generated from, after decoding) the first additional video frame 230a. The envisaged method thus provides an improved way of encoding a video stream captured during a change of a FOV of the camera.

In FIG. 2, references from one encoded video frame to another is illustrated by solid arrows. For example, the solid arrow 240a illustrates how the first additional video frame 230a references the first video frame 220a; the solid arrow 240b illustrates how the second video frame 220b references the first additional video frame 230a, and the solid arrow 240c illustrates how a second additional video frame 230b (if included, as will be discussed later herein) references the first additional video frame 230a, etc. As used herein, the arrows point in the direction information is transferred, e.g. such that the arrow 240a pointing from the first video frame 220a to the first additional video frame 230a indicates that the first additional video frame 230a is the one referencing the first video frame 220a. As envisaged herein, in some embodiments of the method, there may of course also be other references included among the various video frames. Examples of such additional references are indicated in FIG. 2 by dashed arrows, and may for example include the second video frame 220a referencing also the first video frame 220a for e.g. parts not requiring motion vectors, such as e.g. a constant background or similar, etc. Other such optional reference may e.g. include one or more frames being bidirectionally predicted frames (B-frames), including references also to one or more "future" video frames.

In addition to what is described above, the envisaged method may of course also, in some embodiments, continue in a similar fashion in order to encode also one or more additional images captured while the FOV of the camera is changing, for example as part of an ongoing zooming-operation. A method as envisaged herein, and as described by the flowchart 300, may thus include an optional step S307 in which it is checked if the FOV of the camera is still changing. If affirmative, the method may go back (as indicated by the dashed arrow 310) and redo steps S303-S306 again, each time obtaining a new image, generating a new, no-display additional video frame referencing the previous additional video frame, and encoding the new image as part of a new video frame referencing the new additional video frame. If it is not affirmative that the changing of the camera FOV is still ongoing, the method may instead e.g. stop, and for examples revert back to encoding frames as conventionally done, as illustrated by the dashed arrow 312.

As illustrated in FIG. 2, continuing the method 200 may include e.g. obtaining a third image (e.g. the third image 120c) captured by the camera having a third FOV, where the third FOV is different from the second FOV but is also such that it at least partially overlaps the second FOV. This may correspond e.g. to repeating the above step S303, but for "second and third" instead of "first and second", etc. The method may e.g. include generating a second additional video frame 230b which references the first additional video frame 230a, and which includes second motion vectors which, in a similar fashion as the first motion vectors described above, are used to transform an image content of the second image 120b into a FOV which is closer to the third FOV than the second FOV is. Here, the second motion vectors are instead formed based on a difference between the third FOV and the second FOV. This may correspond to e.g. repeating the above step S304, but also with "second and third" instead of "first and second", etc. The method may continue by inserting the second additional video frame 230b into the encoded video stream 210, and marking the second additional video frame 230b as a no-display frame (corresponding to repeating the above step S305, also with "second and third" instead of "first and second", etc.). The method may continue by encoding the third image 120c as part of a third video frame 220c, which may reference e.g. the second additional video frame 230b. The method may, in some embodiments, continue in a similar fashion until the camera's changing of FOV ends. In the present example, this may include obtaining a fourth image, e.g. the fourth image 120d, generating a third additional video frame 230c referencing the second additional video frame 230b, encoding the fourth image 120d in the encoded video stream 210 as part of a fourth video frame 230d referencing the third additional video frame 230d, etc. When detecting that e.g. the zooming has stopped, e.g. by noticing that a fourth FOV of the camera when capturing the fourth image 104d is the same as a fifth FOV of the camera when capturing a fifth image 104e, the method may for example, in some embodiments, stop inserting additional video frames and instead revert back to encoding frames such as done when e.g. no zooming is currently going on. For example, the fifth image 104e may be encoded as part of a fifth video frame 220e referencing the fourth additional video frame 230d, and the next image 230f may be encoded as a video frame 220f referencing the video frame 230e, etc. In particular, the method as envisaged herein mainly applies to the encoding of video frames corresponding to times during which the camera is changing its FOV, and during which times conventional coding using motion vectors is difficult due to such motion vectors being both long and varying due to the changing FOV of the camera.

Although having been exemplified solely by a FOV changing due to a zooming-in-operation (plus an additional panning/tilting-operation) performed by the camera, it should be noted that the envisaged method may also be used to encode video streams during the recording of which there are one or more additional changes of, and/or other causes for changing of, the FOV of the camera. Such examples may e.g. include a rotation of the camera, or any other combination of possible changes related to pan, tilt, roll and/or change of focal length, or similar. It is envisaged that as long as knowledge about the different FOVs used when recording the different images is known (or may otherwise in some way be derived), the motion vectors required to generate the additional video frames may be obtained directly from this knowledge, without requiring any motion vector-searching by the decoder, such as the camera. As long as the FOVs of the additional video frames can thus be made to better, or exactly, match the FOVs of the images captured by the camera, motion vector search can then more efficiently be performed when encoded the captured images by searching in, and referencing to, the additional video frames.

Another embodiment of the envisaged method will now be explained with reference to FIG. 4. Here, it is assumed that a method 400 is still supposed to encode the video stream 100 captured during the zooming-in on the object 110 as shown in FIG. 1, but, in contrast to the method 200 described with reference to FIG. 2, the method 400 instead uses a layered type of coding, such as scalable video coding (SVC). In what follows, only the differences between the method 200 and the method 400 will be highlighted.

The encoded video stream 410 has multiple layers, including at least a base layer 412 and at least one enhancement layer 414. The method 400 starts by obtaining the first image 120a, and encoding this image as part of a first video frame 420a in the base layer 412 (with e.g. a lower resolution), as well as part of a first video frame 440a in the enhancement layer 414 (with details to obtain a higher resolution than that of the base layer 412), as is conventionally done in such layered coding schemes.

After obtaining the second image 120b, a first additional video frame 430a is generated as described earlier herein, and references the first video frame 420a of the base layer 412. The first additional video frame 430a is also encoded in the base layer 412, and marked as a no-display frame.

The second image 120b is however not directly encoded as part of any video frame of the base layer 412, but instead encoded only as part of a second video frame 440b of the enhancement layer 414, wherein the second video frame 440b references the first additional video frame 430a in the base layer 412.

In the same way as described earlier herein, the method 400 may in some embodiments of course also continue to generate and encode more video frames as long as the FOV of the camera is changing. The third image 120c may be obtained, the third FOV used to capture the third image 120c may be compared to the second FOV used to capture the second image 120b, and second motion vectors may be calculated and used to generate a second additional video frame 430b encoded in the base layer 412. Just as before, the third image 120c is not encoded directly in the base layer 412, but is instead encoded as a third video frame 440c in the enhancement layer 414, and made to reference the second additional video frame 430b in the base layer 412. The same procedure may then of course be repeated to obtain e.g. the fourth image 120d, the fifth image 120e, etc., and the corresponding frames may be generated and inserted in the base layer 412 and enhancement layer 414 as described herein. In the present example, this includes generating a third additional video frame 430c in the base layer 412 (marked as no-display, and referencing the second additional video frame 430b), encoding the fourth image 120d as part of a fourth video frame 440d in the enhancement layer 414 (wherein the fourth video frame 440d references the third additional video frame 430c in the base layer 412), etc. Once the zooming-in on the object 110 has stopped, the method 400 may stop generating and inserting additional video frames, and instead revert back to encoding the fifth and sixth images 120e and 120f in both the base layer 412 and enhancement layer 414 again. For example, this may include encoding the fifth image 120e both in a fifth video frame 420e in the base layer 412 (with lower resolution), and in a fifth video frame 440e in the enhancement layer 414 (with details to obtain a higher resolution than that of the base layer 412); and encoding the sixth image 120 both in a sixth video frame 420f in the base layer 412, and in a sixth video frame 440f in the enhancement layer 414. As can be seen in FIG. 4, in the method 400, the additional video frames 230a, 230b and 230c thus replaces what would otherwise be the second, third and fourth normally encoded video frames in the base layer 412.

The fifth video frame 420e in the base layer 412 may e.g. reference the third additional video frame 430c, etc., as indicated by the solid arrows provided in FIG. 4 and as already described with reference to FIG. 2. As also described herein, there may be other references included among the various video frames. For example, as illustrated by the dashed arrows in FIG. 5, each video frame in the enhancement layer 414 may e.g. reference also one or more previous video frames in the enhancement layer 414, and each "normal" (i.e., non-additional video frame) in the base layer 412 may reference one or more previous video frames in the base layer 412. There may of course be other references which are not shown, such as e.g. references to future frames or similar, if deemed.

When compared to the method 200 described with reference to FIG. 2, the method 400 has the advantage that as all additional video frames (e.g. frames 430a-c) are inserted in the base layer 412, they do not affect the FPS rate as the enhancement layer 414 still only includes only one encoded video frame per image captured by the camera. It may also be envisaged that in situations where the enhancement layer 414 is not going to be decoded, e.g. when the processing capability of the encoder is insufficient to do so, or if the enhancement layer 414 is even removed from the encoded video stream 410 before sending the encoded video stream 410 across e.g. a network (to save bandwidth), there may still be some use in retrieving and decoding only the base layer 412, as the "FOV-transformed" image contents of the various captured images generated using motion vectors for scaling, translation and/or rotation found in the additional frames may still be used to render image content.

Figure 5:
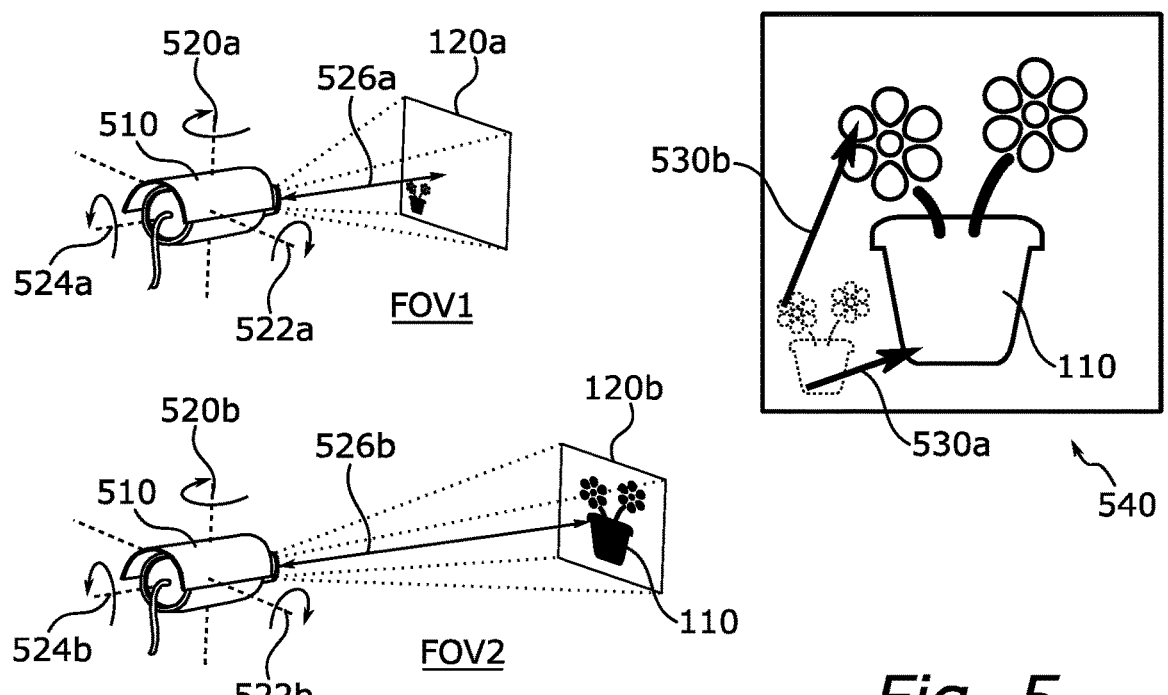
FIG. 5 schematically illustrates examples of how to obtain motion vectors based on knowledge about how a FOV of a camera has changed, in accordance with embodiments of an improved method of the present disclosure, and FIG. 6 schematically illustrates an example of a device for encoding a video stream, in accordance with embodiments of the present disclosure.

FIG. 5 schematically illustrates in more detail how calculation of the required (first) motion vectors can be obtained. Here, as an example, a camera 510 having a first FOV ("FOV1") captures a first image 120a of an object 110. At another (e.g. later) time, the same camera 510 captures a second image 120b of the object 110 while having a different, second FOV ("FOV2"). For illustrative purposes only, in the example provided in FIG. 5, the difference between the first and second FOVs (and thereby the difference between the first and second images 120a and 120b) has in FIG. 5 been exaggerated compared to e.g. FIGS. 1 and 2.

When capturing the first image 120a, the first FOV (FOV1) is defined e.g. by the camera 510 having a first pan-angle 520a, a first tilt-angle 522a, and a first roll-angle 524a, as well as a first focal length 526a. When capturing the second image 120b, the second FOV (FOV2) is defined by the camera 510 having a second pan-angle 520b, a second tilt-angle 522b, a second roll-angle 524b, as well as a second focal length 526b. In this particular example, as discussed above, the roll-angles 524a-b are the same, while the second pan-angle 520b is a bit smaller than the first pan-angle 520a, the second tilt-angle 522b is a bit larger than the first tilt-angle 522a, and the second focal length 526b is larger than the first focal length 526a (as the camera is more zoomed-in in the second FOV than in the first FOV, and panned/tilted slightly left/down). The exact definition of the various angles is not envisaged as being important, as long as the definition allows to measure/detect how the angles have changed between one FOV and the other.

By having knowledge about the first and second FOVs of the camera 510 (e.g., by having knowledge about the angles 520a-b, 522a-b, 524a-b and the focal lengths 526a-b), first motion vectors (e.g. 530a and 530b, etc.) can then be calculated as illustrated in an overlay 540 of the first and second images 120a and 120b also shown in FIG. 5. As can be seen in the overlay 540, the first motion vectors 530a and 530b may be different for different parts (e.g. 550a and 550b) of the second image 120b, as the scaling and translation required to go from the first FOV and closer to the second FOV may cause different parts of the object 110 to move in different directions and with different speeds. There may of course be other, additional first motion vectors than those illustrated in FIG. 5, e.g. for each part of the second image 120b.

Herein, it is also envisaged to provide a device for encoding a video stream, as will now be described in more detail with reference also to FIG. 6.

Figure 6:
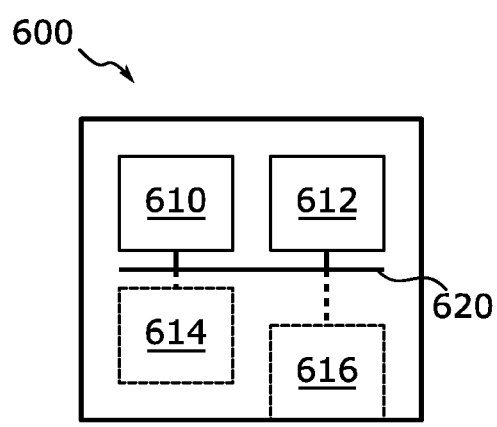

FIG. 6 schematically illustrates a device 600 for encoding a video stream as discussed earlier herein, i.e. a device configured to perform e.g. the method 200 described with reference to FIG. 2, and/or the method 400 described with reference to FIG. 4. The device 600 includes at least a processor (or "processing circuitry") 610 and a memory 612. As used herein, a "processor" or "processing circuitry" may for example be any combination of one or more of a suitable central processing unit (CPU), multiprocessor, microcontroller (µC), digital signal processor (DSP), application-specific integrated circuit (ASIC), field-programmable gate-array (FPGA), graphics processing unit (GPU), etc., capable of executing software instructions stored in the memory 612. The memory 612 may be external to the processor 610, or may be internal to the processor 610. As used herein, a "memory" may be any combination of random-access memory (RAM) and read-only memory (ROM), or any other kind of memory capable of storing the instructions. The memory 612 contains (i.e. stores) instructions that, when executed by the processor 610, cause the device 600 to perform a method as described herein (i.e. the method 200, 400 or any embodiments thereof). The device 600 may further include one or more additional items 614 which may, in some situations, be useful for performing the method. In some example embodiments, the device 600 may for example be a (video) camera, such as a video monitoring camera, and the additional item(s) 614 may then include e.g. an image sensor and for example one or more lenses for focusing light from a scene on the image sensor, such that the monitoring camera may capture images of a scene as part of performing the envisaged method. The additional item(s) 614 may also include e.g. various other electronics components needed for capturing the scene, e.g. to properly operate the image sensor and/or lenses as desired, and to gather information pertinent to e.g. a current orientation and/or focal length of the camera and lens(es), which can be used to calculate how to create motion vectors based on e.g. difference between two FOVs. Performing the method in a monitoring camera may be useful in that the processing is moved to "the edge", i.e. closer to where the actual scene is captured compared to if performing the processing and video encoding somewhere else (such as at a more centralized processing server or similar). The device 600 may for example be connected to a network such that the encoded video stream resulting from performing the method may be transmitted to a user. For this purpose, the device 600 may include a network interface 616, which may be e.g. a wireless network interface (as defined in e.g. any of the IEEE 802.11 or subsequent standards, supporting e.g. Wi-Fi) or a wired network interface (as defined in e.g. any of the IEEE 802.3 or subsequent standards, supporting e.g. Ethernet). The network interface 616 may for example also support any other wireless standard capable of transferring encoded video, such as e.g. Bluetooth or similar. The various components 610, 612, 614 and 616 (if present) may be connected via one or more communication buses 620, such that these components may communicate with each other, and exchange data as required.

The device 600 may for example be a monitoring camera mounted or mountable on a building, e.g. in form of a PTZ-camera or e.g. a fisheye-camera capable of providing a wider perspective of the scene, or any other type of monitoring/surveillance camera. The device 600 may for example be a body camera, action camera, dashcam, or similar, suitable for mounting on persons, animals and/or various vehicles, or similar. The device 600 may for example be a smartphone or tablet which a user can carry and film a scene. In any such examples of the device 600, it is envisaged that the device 600 may include all necessary components (if any) other than those already explained herein, as long as the device 600 is still able to perform the method 200, 400 or any embodiments thereof as envisaged herein.

Although not explicitly shown in FIG. 6, the device 600 and the processor 610 may for example be structured into one or more computing blocks, each responsible for performing a functionality in accordance with a particular step of e.g. the methods 200 and 400, as shown in the flowchart 300 of FIG. 3. For example, one such functional block may be configured to obtain the first image 120*a* (i.e. to perform step S301), and another functional block may be configured to encode the first image (i.e. to perform step S302), and so on, until all steps of the method 200, 400, or other embodiments thereof, is carried out by the device 600.

In summary of the various embodiments presented herein, the present disclosure provides an improved way of encoding a video stream in a situation when, during capturing of the images of the video stream, a FOV of the camera changes (such as during e.g. a zooming-operation performed by the camera). By inserting one or more additional, no-display frames which successively transforms an image content of an image captured before the FOV-change started to match the FOVs of the camera at the various stages of the FOV-change, and by basing such transforms on motion vectors found directly from knowledge about the FOVs (and without requiring motion vector-searching), a more efficient and less computationally intensive encoding can be performed. The various images of the bit stream during the change of FOV may then be encoded with motion vectors referencing the various additional video frames, by performing motion vector-searching which does not result in/from e.g. long and varying motion vectors. The envisaged method, and corresponding device, computer program and computer program product, as described herein thus satisfies an apparent need for encoding such video streams, as encoding techniques based solely on motion vector-searching often turn out not to be computationally tractable, particularly in real- or close to real-time situations.

Although features and elements may be described above in particular combinations, each feature or element may be used alone without the other features and elements or in various combinations with or without other features and elements. Additionally, variations to the disclosed embodiments may be understood and effected by the skilled person in practicing the claimed invention, from a study of the drawings, the disclosure, and the appended claims.

In the claims, the words "comprising" and "including" does not exclude other elements, and the indefinite article "a" or "an" does not exclude a plurality. The mere fact that certain features are recited in mutually different dependent claims does not indicate that a combination of these features cannot be used to advantage.

LIST OF REFERENCE NUMERALS

100 video stream as captured by camera
110 object in camera FOV
120*a-f* first to sixth images
200 method of encoding a video stream
210 encoded video stream
220*a-f* video frames of encoded video stream
230*a-c* additional, no-display video frames
240*a-c* reference arrows
300 flowchart of envisaged method
310, 312 arrows indicating method-flow
S301-S307 method steps
400 method of encoding a video stream (layered)
410 encoded video stream (layered)
412 base layer
414 enhancement layer
420*a,e-f* video frames in base layer
430*a-c* additional, no-display video frames in base layer
440*a-f* video frames in enhancement layer
510 (video) camera
520*a-b* first and second pan-angles of camera
522*a-b* first and second tilt-angles of camera
524*a-b* first and second roll-angles of camera
526*a-b* first and second focal lengths of camera
530*a-b* first motion vectors
540 overlay of first and second images
600 device
610 processor
612 memory
614 additional item(s)
614 network interface
620 communication bus(es)
FOV1, FOV2 first and second FOVs of camera

The invention claimed is:

1. A method of encoding a video stream, comprising:
    a) obtaining a first image of a scene captured by a video camera at a first time;
    b) encoding the first image as part of a first video frame of an encoded video stream;
    c) obtaining a second image of the scene captured by the video camera at a second time;
    d1) obtaining data indicative of a first difference in orientation, zoom-level and/or position of the video camera relative to the scene at the first time compared to the second time, and calculating first motion vectors based on said indicated first difference;
    d2) generating a first additional video frame referencing the first video frame, the first additional video frame including the first motion vectors for transforming an image content of the first image;
    e) inserting the first additional video frame into the encoded video stream, including marking the first additional video frame as a no-display frame, and
    f) encoding the second image as part of a second video frame of the encoded video stream, wherein the second video frame references the first additional video frame.

2. The method according to claim 1, further comprising using a layered type of coding such as scalable video-coding (SVC) wherein the first additional video frame is inserted in a base layer of the encoded video stream, and the second video frame is inserted in an enhancement layer of the encoded video stream.

3. The method according to claim 1, wherein the first additional video frame is one of a predicted frame, P-frame, or a bidirectional predicted frame, B-frame.

4. The method according to claim 1, further comprising:
    g) obtaining a third image of the scene captured by the video camera at a third time;
    h1) obtaining data indicative of a second difference in orientation, zoom-level and/or position of the video camera at the second time and third time, and calculating second motions vectors based on said second difference;
    h2) generating a second additional video frame referencing the first additional video frame, wherein the second additional video frame includes the second motion vectors for transforming an image content of the second image;
    i) inserting the second additional video frame into the encoded video stream, including marking the second additional video frame as a no-display frame, and j) encoding the third image as part of a third video frame of the encoded video stream, wherein the third video frame references the second additional video frame.

5. The method according to claim 1, wherein the first difference is due to a zooming-operation performed by the camera.

6. The method according to claim 5, wherein the zooming-operation is a zooming-in-operation.

7. The method according to claim 1, wherein the first and second images are sequential images of a video stream captured by the camera.

8. A device for encoding a video stream, comprising:
a processor, and
a memory storing instructions that, when executed by the processor, cause the device to:
  a) obtain a first image of a scene captured by a video camera at a first time;
  b) encode the first image as part of a first video frame of an encoded video stream;
  c) obtain a second image of the scene captured by the video camera at a second time;
  d1) obtain data indicative of a first difference in orientation, zoom-level and/or position of the video camera relative to the scene at the first time compared to at the second time, and calculate first motion vectors based on the indicated first difference;
  d2) generate a first additional video frame referencing the first video frame, the first additional video frame including the first motion vectors for transforming an image content of the first image;
  e) insert the first additional video frame into the encoded video stream, including marking the first additional video frame as a no-display frame; and
  f) encode the second image as part of a second video frame of the encoded video stream, wherein the second video frame references the first additional video frame.

9. The device according to claim 8, wherein the instructions are such that they, when executed by the processor, further cause the device to perform use a layered type of coding such as scalable video-coding (SVC) wherein the first additional video frame is inserted in a base layer of the encoded video stream, and the second video frame is inserted in an enhancement layer of the encoded video stream.

10. The device according to claim 8, wherein the device is a camera for capturing the first and second images.

11. A computer program for encoding a video stream, configured to, when executed by a processor of a device including a computer-readable storage medium, cause the device to:
  a) obtain a first image of a scene captured by a video camera at a first time;
  b) encode the first image as part of a first video frame of an encoded video stream;
  c) obtain a second image of the scene captured by the video camera at a second time;
  d1) obtain data indicative of a first difference in orientation, zoom-level and/or position of the video camera relative to the scene at the first time compared to at the second time, and calculate first motion vectors based on the indicated first difference;
  d2) generate a first additional video frame referencing the first video frame, the first additional video frame including the first motion vectors for transforming an image content of the first image;
  e) insert the first additional video frame into the encoded video stream, including marking the first additional video frame as a no-display frame; and
  f) encode the second image as part of a second video frame of the encoded video stream, wherein the second video frame references the first additional video frame.

12. The computer program according to claim 11, further configured to cause the device to use a layered type of coding such as scalable video-coding (SVC) wherein the first additional video frame is inserted in a base layer of the encoded video stream, and the second video frame is inserted in an enhancement layer of the encoded video stream.

* * * * *